(12) United States Patent
Merrin et al.

(10) Patent No.: US 8,073,763 B1
(45) Date of Patent: Dec. 6, 2011

(54) TRADE EXECUTION METHODS AND SYSTEMS

(75) Inventors: Seth I. Merrin, New York, NY (US);
Steven B. Greenblatt, Summit, NJ (US);
John J. Halloran, New York, NY (US);
Ilya Gutman, Guttenberg, NJ (US);
Kevin M. Lupowitz, New York, NY (US)

(73) Assignee: Liquidnet Holdings, Inc., New York, NY (US)

( * ) Notice: Subject to any disclaimer, the term of this patent is extended or adjusted under 35 U.S.C. 154(b) by 378 days.

(21) Appl. No.: 11/533,675

(22) Filed: Sep. 20, 2006

Related U.S. Application Data

(60) Provisional application No. 60/718,986, filed on Sep. 20, 2005.

(51) Int. Cl.
*G06Q 40/00* (2006.01)
(52) U.S. Cl. ............................................. 705/37; 705/35
(58) Field of Classification Search ........................ None
See application file for complete search history.

(56) References Cited

U.S. PATENT DOCUMENTS

| | | |
|---|---|---|
| 3,573,747 A | 4/1971 | Adams et al. |
| 4,412,287 A | 10/1983 | Braddock, III |
| 4,674,044 A | 6/1987 | Kalmus et al. |
| 4,903,201 A | 2/1990 | Wagner |
| 5,101,353 A | 3/1992 | Lupien et al. |
| 5,136,501 A | 8/1992 | Silverman et al. |
| 5,297,031 A | 3/1994 | Gutterman et al. |
| 5,497,317 A | 3/1996 | Hawkins et al. |
| 5,787,402 A | 7/1998 | Potter et al. |
| 5,809,483 A | 9/1998 | Broka et al. |
| 5,924,082 A | 7/1999 | Silverman et al. |
| 5,924,083 A | 7/1999 | Silverman et al. |
| 5,926,801 A | 7/1999 | Matsubara et al. |
| 5,950,176 A | 9/1999 | Keiser et al. |
| 6,029,146 A | 2/2000 | Hawkins et al. |

(Continued)

FOREIGN PATENT DOCUMENTS

JP  02004287893  10/2004

OTHER PUBLICATIONS

Svaldi Aldo, Wall Street Looks to Durango for Help, Denver Business Journal; Feb. 2, 1998.

(Continued)

*Primary Examiner* — Gregory Johnson
(74) *Attorney, Agent, or Firm* — Greenberg Traurig, LLP

(57) ABSTRACT

The present invention is directed to the field of securities trading. One embodiment of the present invention relates to securities trading using electronic systems. Another embodiment of the present invention relates to a computer implemented trade execution method, comprising: sending from an execution venue to each of a plurality of smart order routers a notification message; receiving at each of the smart order routers the notification message sent thereto, wherein the notification message notifies each of the smart order routers about the presence of a non-displayed priced order at the execution venue; sending from at least one of the smart order routers to the execution venue at least one order to execute against the non-displayed priced order; receiving at the execution venue each order sent from each of the smart order routers; and executing at least one order received from at least one of the smart order routers against the non-displayed priced order.

27 Claims, 4 Drawing Sheets

U.S. PATENT DOCUMENTS

| | | | |
|---|---|---|---|
| 6,058,379 | A | 5/2000 | Odom et al. |
| 6,112,189 | A | 8/2000 | Rickard et al. |
| 6,131,087 | A | 10/2000 | Luke et al. |
| 6,134,535 | A | 10/2000 | Belzberg |
| 6,141,653 | A | 10/2000 | Conklin et al. |
| 6,157,918 | A | 12/2000 | Shepherd |
| 6,195,647 | B1 | 2/2001 | Martyn et al. |
| 6,247,000 | B1 | 6/2001 | Hawkins et al. |
| 6,272,474 | B1 | 8/2001 | Garcia |
| 6,278,982 | B1 | 8/2001 | Korhammer et al. |
| 6,313,833 | B1 | 11/2001 | Knight |
| 6,401,080 | B1 | 6/2002 | Bigus et al. |
| 6,408,282 | B1 | 6/2002 | Buist |
| 6,418,419 | B1 | 7/2002 | Nieboer et al. |
| 6,421,653 | B1 | 7/2002 | May |
| 6,493,683 | B1 | 12/2002 | David et al. |
| 6,505,175 | B1 | 1/2003 | Silverman et al. |
| 7,035,819 | B1 * | 4/2006 | Gianakouros et al. ........ 705/37 |
| 7,099,839 | B2 * | 8/2006 | Madoff et al. ............... 705/37 |
| 7,136,834 | B1 | 11/2006 | Merrin et al. |
| 7,162,448 | B2 * | 1/2007 | Madoff et al. ............... 705/37 |
| 7,315,840 | B1 * | 1/2008 | Keith ............................ 705/37 |
| 7,487,125 | B2 * | 2/2009 | Littlewood ................... 705/37 |
| 2001/0044767 | A1 * | 11/2001 | Madoff et al. ............... 705/37 |
| 2002/0007335 | A1 | 1/2002 | Millard et al. |
| 2002/0019795 | A1 * | 2/2002 | Madoff et al. ............... 705/37 |
| 2002/0052824 | A1 | 5/2002 | Mahanti et al. |
| 2002/0055901 | A1 * | 5/2002 | Gianakouros et al. ........ 705/37 |
| 2002/0099651 | A1 * | 7/2002 | May ............................. 705/38 |
| 2003/0009411 | A1 | 1/2003 | Ram et al. |
| 2003/0014351 | A1 * | 1/2003 | Neff et al. .................... 705/37 |
| 2003/0014354 | A1 * | 1/2003 | Madoff et al. ............... 705/37 |
| 2003/0050888 | A1 | 3/2003 | Satow et al. |
| 2003/0149653 | A1 * | 8/2003 | Penney et al. ................ 705/37 |
| 2003/0225675 | A1 * | 12/2003 | Failla et al. .................. 705/37 |
| 2004/0024689 | A1 | 2/2004 | Zhou et al. |
| 2004/0034591 | A1 * | 2/2004 | Waelbroeck et al. .......... 705/37 |
| 2004/0059666 | A1 * | 3/2004 | Waelbroeck et al. .......... 705/37 |
| 2004/0143542 | A1 * | 7/2004 | Magill et al. ................. 705/37 |
| 2004/0199453 | A1 | 10/2004 | Brady et al. |
| 2004/0210508 | A1 * | 10/2004 | Bohnenberger ............... 705/37 |
| 2004/0210511 | A1 * | 10/2004 | Waelbroeck et al. .......... 705/37 |
| 2004/0236662 | A1 | 11/2004 | Korhammer et al. |
| 2005/0091142 | A1 | 4/2005 | Renton et al. |
| 2005/0114257 | A1 | 5/2005 | Penney |
| 2005/0114258 | A1 | 5/2005 | Penney |
| 2005/0137964 | A1 * | 6/2005 | Nordlicht et al. ............. 705/37 |
| 2005/0149428 | A1 * | 7/2005 | Gooch et al. ................. 705/37 |
| 2005/0197916 | A1 * | 9/2005 | Newell et al. ................ 705/26 |
| 2005/0203825 | A1 | 9/2005 | Angle et al. |
| 2005/0246263 | A1 | 11/2005 | Ogg et al. |
| 2006/0015446 | A1 | 1/2006 | Burkhardt et al. |
| 2006/0020536 | A1 | 1/2006 | Renton et al. |
| 2006/0026090 | A1 * | 2/2006 | Balabon ....................... 705/37 |
| 2006/0080220 | A1 | 4/2006 | Samuel et al. |
| 2006/0100954 | A1 | 5/2006 | Schoen |
| 2006/0136318 | A1 | 6/2006 | Rafieyan et al. |
| 2006/0136326 | A1 | 6/2006 | Heckman et al. |
| 2006/0161494 | A1 * | 7/2006 | Littlewood ................... 705/37 |
| 2007/0055607 | A1 * | 3/2007 | Wunsch et al. ............... 705/37 |

OTHER PUBLICATIONS

Davis Jeffrey, Big Storm Rising; Business 2.0; Sep. 1, 1998.

Microsoft Press Computer Dictionary, Third Edition, 1997 p. 456.

* cited by examiner

TRADE EXECUTION METHODS AND SYSTEMS

RELATED APPLICATIONS

This application claims the benefit of U.S. Provisional Application Ser. No. 60/718,986, filed Sep. 20, 2005, which is incorporated herein by reference in its entirety.

FIELD OF THE INVENTION

The present invention is directed to the field of securities trading. One embodiment of the present invention relates to securities trading using electronic systems.

For the purposes of describing and claiming the present invention the term "execution venue" refers to any computer system where the point of execution of a trade occurs. The term "execution venue" includes an agency execution venue (which acts as execution venue for both sides) and a principal execution venue (which trades against the customer). Examples of execution venues include (but are not limited to): ECN, Stock Exchange, ATS, Broker.

Further, for the purposes of describing and claiming the present invention the term "smart order router" refers to an electronic system that creates and maintains an internal montage of bids and offers and routes orders to one or more execution venues based on the internal montage.

Further still, for the purposes of describing and claiming the present invention the term "notification message" refers to an electronic message that indicates the presence of an order. Examples of information contained in a notification message include (but are not limited to): Side/Symbol/Size/Price.

Further still, for the purposes of describing and claiming the present invention the term "non-displayed priced order" refers to an order to buy or sell a security, wherein the presence of the order is known only by the execution venue where the order is and through the transmission of one or more notification messages to one or more smart order routers only for the purpose of incorporation into the internal montages of each of the smart order routers. For example, the non-displayed priced order may be an order instruction where the order price is calculated based on the best bid, best ask, mid-point or last sale price in the market ("reference price") and may or may not include a spread relative to the reference price.

Further still, for the purposes of describing and claiming the present invention the term "mid-peg order" refers to an order to buy or sell a security at the mid-point between the best bid and the best ask in the National Best Bid and Offer, To give one example, if the spread is one cent, the mid-point is ½ cent above the best bid and below the best ask. In another example, if the spread is three cents, the mid-point is 1 and ½ cent above the best bid and below the best ask. In another example, if the spread is four cents, the mid-point is 2 cents above the best bid and below the best ask. In another example, if the spread is zero cents, the mid-point is the best bid/best ask. In another example, if the spread is negative (i.e., the best bid is higher than the best ask), the order would not be executed.

Further still, for the purposes of describing and claiming the present invention the term "National Best Bid and Offer" refers to either the Consolidated National Best Bid and Offer of the highest bid/lowest ask of all execution venues trading a given security or the Best Bid and Offer of the highest bid/lowest ask of the primary market trading a given security.

Further still, for the purposes of describing and claiming the present invention the term "security" refers to any ownership or creditorship interest, such as a stock certificate or bond, or any other financial instrument, contract, or transaction, such as a forward, futures, option, put, call, collar, swap, or currency contract. This definition includes for example (but is not limited to): any note, stock, bond, debenture, certificate of interest or participation in any profit-sharing agreement or in any oil, gas, or other mineral royalty or lease, any collateral trust certificate, investment contract, voting-trust certificate, certificate of deposit, any put, call, straddle, option, or privilege on any of the foregoing, or group or index of securities (including any interest therein or based on the value thereof).

Further still, for the purposes of describing and claiming the present invention the term "member" refers to an entity that has entered into an agreement to use the execution venue for trading purposes, whereby the member has access to the GUI of the execution venue.

Further still, for the purposes of describing and claiming the present invention the term "trader" refers to an individual within a member who has been authorized by the member's system administrator to access the execution venue for trading (whereby the trader has access to the GUI of the execution venue).

Further still, for the purposes of describing and claiming the present invention the term "streaming liquidity provider" refers to a broker or other entity that has entered into an agreement to route orders to the execution venue, whereby the streaming liquidity provider does not have access to the GUI of the execution venue to view orders of the execution venue.

BACKGROUND OF THE INVENTION

While computers are conventionally used to facilitate trading of securities, manual intervention is still typically required at certain steps in the trading process. For example, traders at institutional investment management firms typically record their orders to purchase or sell securities in computerized order management systems (OMS's). Historically, one or more traders at each firm must manually review the orders in the OMS and attempt fill the orders by contacting one or more market intermediaries. The traders transmit the orders in the OMS by telephone or separate data entry links to registered broker-dealers for the securities, to electronic marketplaces that trade the securities, or to other market intermediaries.

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

Figure 1:
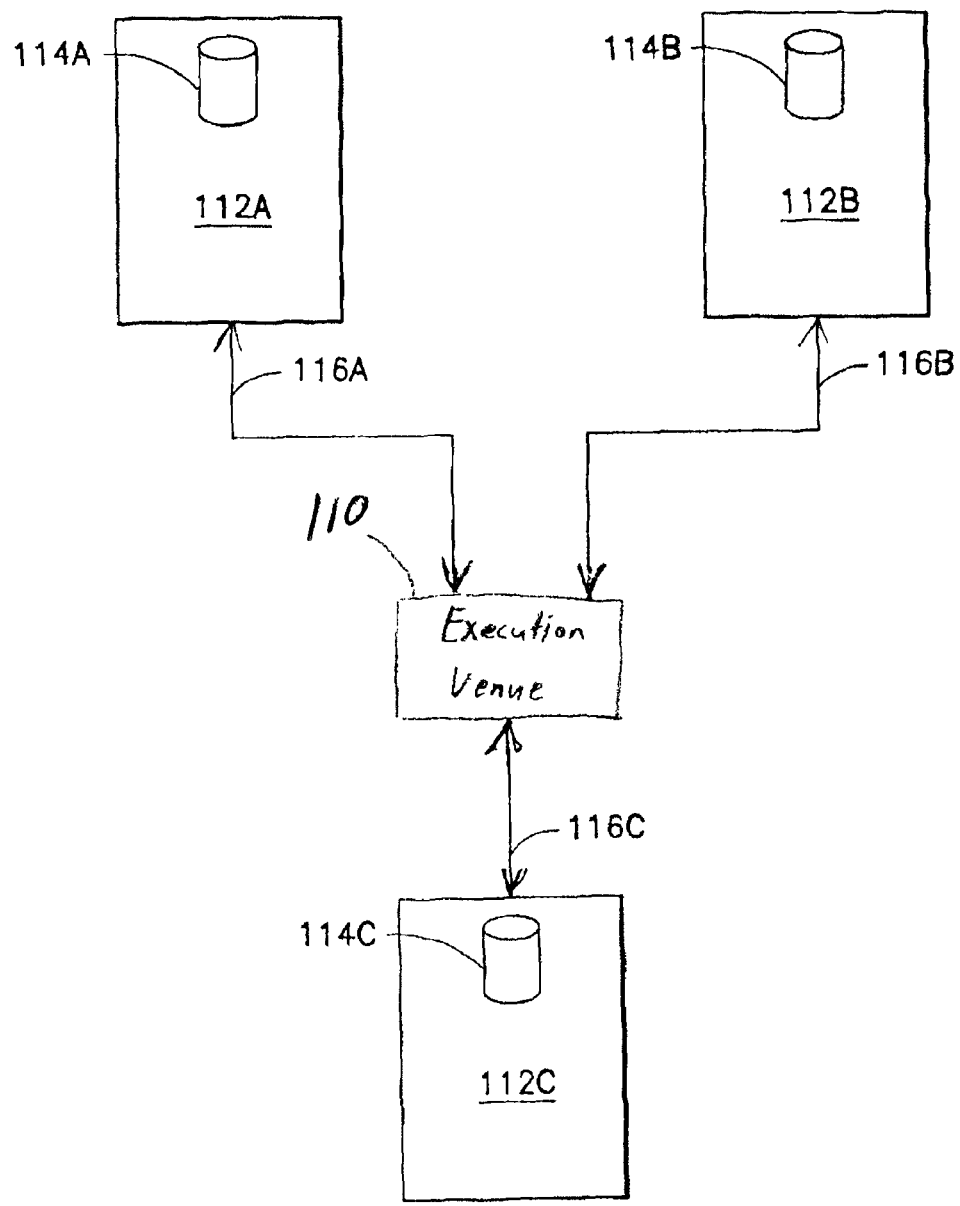
FIG. 1 shows a block diagram illustrating an execution venue in communication with three trading systems according to an embodiment of the present invention.

Referring now to FIG. 1, a block diagram illustrating an execution venue in communication with three trading systems according to an embodiment of the present invention is shown. More particularly, as seen in this FIG. 1, execution venue 110 is in communication (e.g., electronic communication) with three trading systems 112A, 112B, 112C (although three trading systems are illustrated in this example, embodiments of the present invention can, of course, have more (or fewer) trading systems in communication with the execution venue).

Each of the trading systems 112A, 112B, 112C is used by an investment management firm or other entity that is a member by virtue of having established a relationship with the execution venue 110 (e.g., established a relationship with an entity that operates the execution venue). Each of the trading systems 112A, 112B, 112C communicates with the execution venue 110 to facilitate the trading of securities (the following description will describe the trading of stock).

Within each of the trading systems 112A, 112B, 112C is a database 114A, 114B, 114C associated with an order management system ("OMS"). Each OMS database 114A, 114B, 114C holds data representative of contemplated and/or completed orders to buy and/or sell securities by traders using the trading systems 112A, 112B, 112C. For example, assume that the database 114A of trading system 112A contains orders to sell 50,000 shares of DELL and 75,000 shares of MSFT and orders to buy 25,000 shares of CPQ and 100,000 shares of IBM. Also assume that the database 114B of trading system 112B contains orders to sell 30,000 shares of CPQ and buy 62,000 shares of T.

In one embodiment of the present invention, the orders in each of the databases 114A, 114B, 114C are automatically (i.e., without manual intervention) transmitted to the execution venue 110. Likewise, any changes in the orders, such as modifications and/or withdrawals, are automatically transmitted to the execution venue 110. The execution venue 110 may anonymously transmit information about one trader's orders to other traders using the execution venue, subject to filtering in accordance with filtering criteria established by: one or more members authorized to trade using the execution venue, one or more traders associated with the members and/or the execution venue (e.g., established by an entity that operates the execution venue). Moreover, the execution venue 110 may manage anonymous negotiations between traders using the trading systems 112A, 112B, 112C for the purpose of executing the orders. Further, execution venue 110 may send data about the completed trades to the OMS's of the traders involved in the transaction.

Thus, in this example, the present invention selectively broadcasts information about the orders received by the execution venue 110 from the database 114A of trading system 112A to the other trading systems 112B, 112C. Likewise, the execution venue 110 selectively broadcasts information about the orders received from the database 114B of trading system 112B to the other trading systems 112A, 112C. Further, the execution venue 110 selectively broadcasts information about the orders received from the database 114C of trading system 112C to the other trading systems 112A, 112B. In this example, if the traders desire to make a trade, the execution venue 110 will facilitate the anonymous negotiation and sale of 25,000 shares of CPQ from a trader using trading system 112B to a trader using trading system 112A. Information about the sale, such as the quantity and price, can also be selectively transmitted to traders using the other trading system 112C.

Data may be communicated between the trading systems 112A, 112B, 112C and the execution venue 110 using interfacing links 116A, 116B, 116C. Any known interfacing technologies can be used to effectuate these links, including, but not limited to, transmission control protocol/Internet protocol (TCP/IP), satellite, cellular, and/or radio frequency (RF) links, or some combination thereof. The links may pass through one or more intermediate data processing systems, such as telephone switches or Internet servers, before reaching the execution venue 110 or one or more of the trading systems 112A, 112B, 112C. In embodiments where data travels over shared links, such as embodiments where data travels over the public Internet, the data may be encrypted using a secure protocol, such as the secure sockets layer (SSL).

Figure 2:
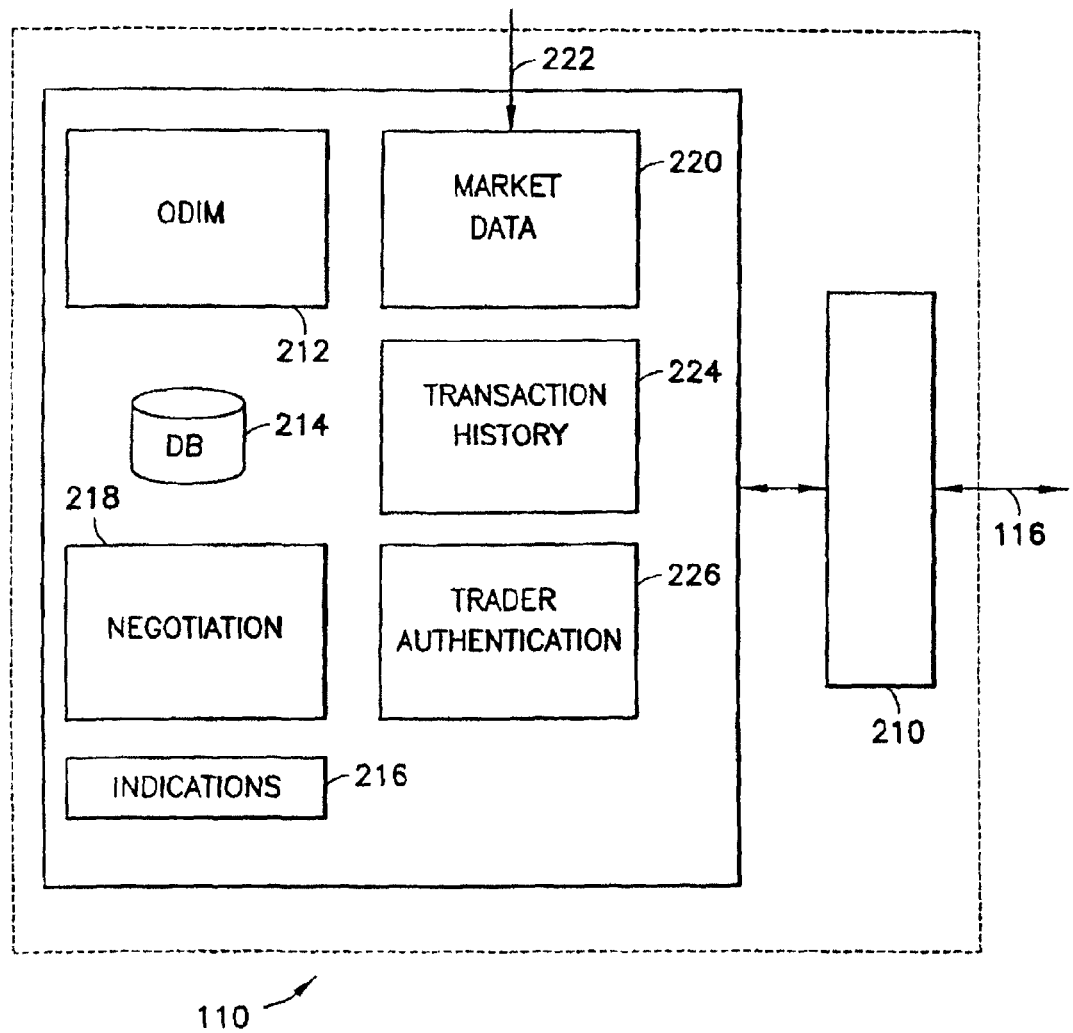
FIG. 2 shows a block diagram illustrating more details of the execution venue of FIG. 1 according to an embodiment of the present invention.

Referring now to FIG. 2, a block diagram illustrating more details of the execution venue of FIG. 1 is shown. Those of skill in the art will recognize that FIG. 2 illustrates only one possible embodiment of the execution venue 110. Of course, different combinations of hardware and software can be used to provide the functionality of the execution venue 110 described herein.

Data received by the execution venue 110 from the trading systems 112A, 112B, 112C over the interfacing links 116A, 116B, 116C of FIG. 1 (shown in this FIG. 2 as a single interfacing link 116) is received by a firewall 210. As is known in the art, the firewall 210 helps prevent unauthorized users from gaining access to the rest of the execution venue 110, and monitors transfers of data to and from the network.

Data that passes through the firewall 210 is received by one or more modules that perform the functionality of the execution venue 110. As used herein, the term "module" includes machine-executable code and/or data, but may also include associated circuitry, such as processing circuitry, as well as data storage areas, and/or any other software or hardware. Thus, it will be appreciated that one or a combination of hardware and software, such as a computer system executing software for performing the functionality of the modules, may implement each of the modules shown in FIG. 2. It will also be appreciated by those skilled in the art that the execution venue 110 may comprise one or more other types of modules, circuitry, etc., which is not shown in FIG. 2. For instance, the execution venue 110 may include one or more microprocessors, network connection circuitry, and/or data storage areas, such as read-only memory (ROM), random-access memory (RAM), CDROM, DVD, tape drive, hard disk (HD), and/or other types of storage areas. It will also be appreciated that the functionality of multiple modules described herein can be combined into a single module and the functionality of a single module can be split or shared among multiple modules. Moreover, alternative embodiments of the present invention may lack one or more of the modules described herein and/or have modules not described herein.

In one embodiment, the execution venue 110 may include an OMS data integration module (ODIM) 212. The ODIM 212 receives and processes data representative of orders received from the OMS databases 114A, 114B, 114C in the trading systems 112A, 112B, 112C. In one example, the data from the OMS databases 114A, 114B, 114C are provided to the execution venue 110 in a standardized format that requires little or no processing by the ODIM 212. In another example, the data from the OMS databases 114A, 114B, 114C are provided to the execution venue 110 in one or more different formats (e.g., depending upon factors such as the type of OMS used by each of the trading systems 112A, 112B, 112C, the types of interfacing links supplying the data to the execution venue 110, the type of security or orders to which the data pertains, and the like). In this latter example, the ODIM 212 may convert the data into a standardized format for use by other modules in the execution venue 110.

The orders processed by the ODIM 212 are stored in an execution venue database 214. Data in the execution venue database 214 may be accessible to the other modules in the execution venue 110. In addition, the other modules in the execution venue 110 may store other data in the illustrated execution venue database 214 or other databases as may be required during normal operation.

An indications module 216 transmits information about orders received by the execution venue 110 among the various traders based upon filtering criteria established by: one or more members authorized to trade using the execution venue, one or more of the traders associated with the members and/or the execution venue 110 (e.g., established by an entity that operates the execution venue). This information may be transmitted among the traders in the form of non-binding indications.

Based upon these indications, one trader can enter into negotiations with other traders through a negotiation module 218. The negotiation module 218 facilitates negotiations between traders using trading systems and having contra interests. In one embodiment, at least parts of the negotiations are conducted anonymously, in order to limit the spread of information about the traders' activities.

A market data module 220 receives real-time and other market data from an input 222. The market data module 220 provides the market data to the negotiation module 218 and to the traders. The traders may use the market data during the negotiations to determine market prices for the securities.

A transaction history module 224 records transactions performed by the execution venue 110 in the database 214. The transaction history module 224 may also record other data processed by the execution venue 110 including (but not limited to), for example, information about orders received from and sent to the trading systems 112A, 112B, 112C and the negotiations conducted (successful or not). This module 224 may be used to audit the transactions conducted on the execution venue 110.

A trader authentication module 226 authorizes and authenticates traders who log into the execution venue 110 in order to perform trading negotiations and/or other functions. In one embodiment, the trader authentication module 226 stores authentication information, such as a login ID/password pair in the database 214. The trader authentication module 226 may also store profiles for the registered traders.

Other modules that may be present in the execution venue 110 include (but are not limited to) load monitoring modules for monitoring the load on various servers comprising the execution venue 110, fault tolerance modules for providing fault tolerance to the execution venue 110, security modules for detecting and/or preventing security violations on the execution venue 110, and back office modules for providing back office functionality (these modules are not shown in FIG. 2).

Figure 3:
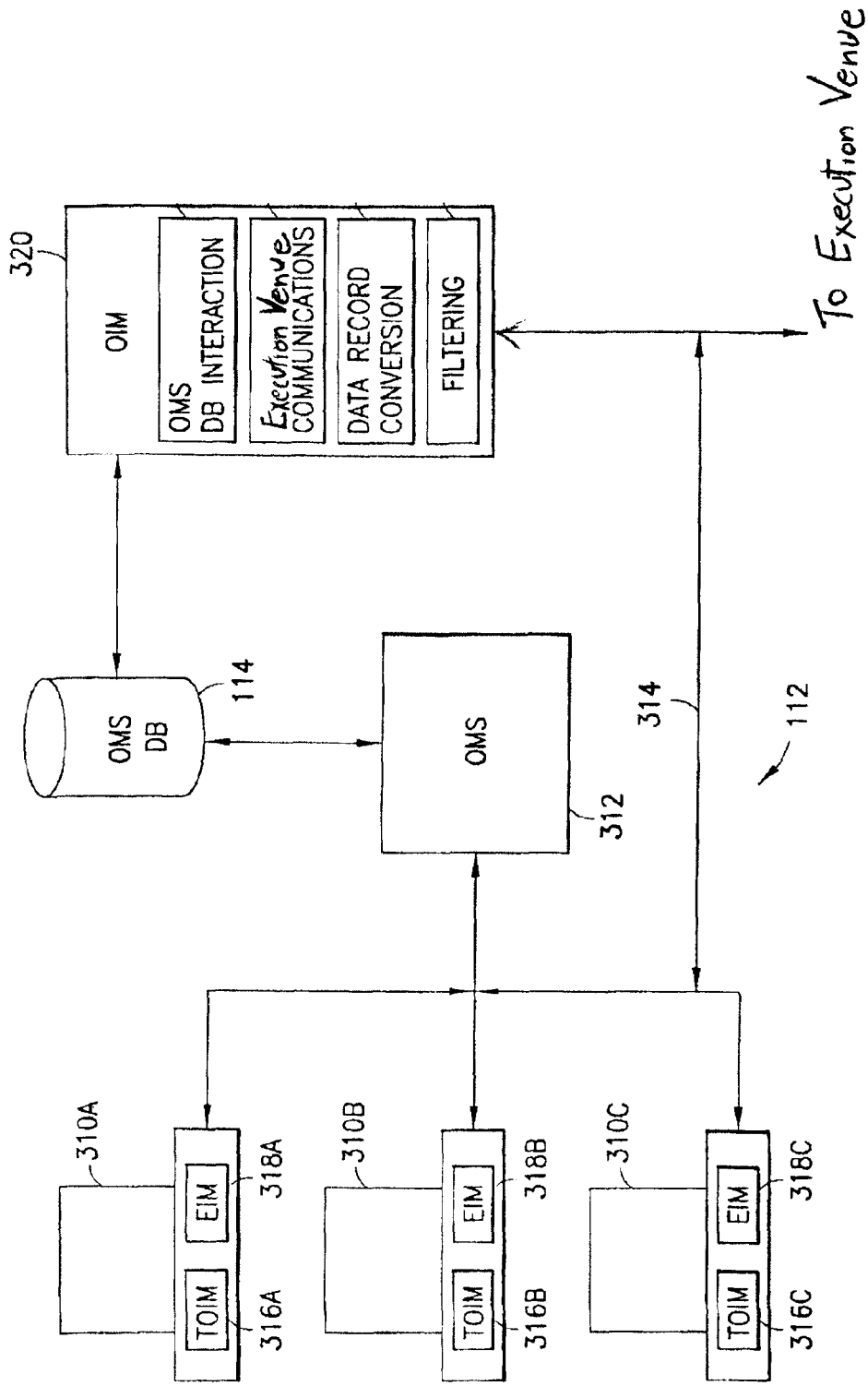
FIG. 3 shows a block diagram illustrating more details of a trading system of the type shown in FIG. 1 according to an embodiment of the present invention.

FIG. 3 is a block diagram illustrating trading system 112 (this trading system 112 is of the type shown in FIG. 1, which depicts three trading systems 112A, 112B, 112C). Those of ordinary skill in the art will recognize that FIG. 3 illustrates only one possible embodiment of a trading system 112 and alternative embodiments of the trading system may be constructed. FIG. 3 illustrates three workstations 310A, 310B, 310C coupled to an OMS 312 via a network 314. The workstations 310A, 310B, 310C may be general-purpose or specific-purpose computer systems executing software (e.g., specialized software) for facilitating trading of securities. Although only three workstations 310A, 310B, 310C are illustrated, a trading system 112 can have any desired number of workstations.

In an example trading system 112 that interacts with the execution venue 110, each workstation 310A, 310B, 310C executes a trader OMS interaction module (TOIM) 316A, 316B, 316C for facilitating interactions with the OMS 312. In this example trading system 112, each TOIM 316A, 316B, 316C allows a respective trader to add, delete, or modify contemplated orders stored in the OMS database 114. Contemplated orders may be stored in the OMS database 114, for example, because the trader intends to execute certain transactions in stages, or because the contemplated transactions are desirable only if the market prices of the securities to be traded are within a certain range (e.g., limit orders). Therefore, such contemplated orders serve as placeholders indicating the total quantity of a security that a trader wishes to transact (as well as possibly conditions for transacting other orders); other data in the database 114 may indicate the quantity of the security that has been transacted to date.

Each workstation 310A, 310B, 310C executes an execution venue interaction module (EIM) 318A, 318B, 318C for facilitating interactions with the execution venue 110. In alternative embodiments of the present invention, each EIM 318A, 318B, 318C may be incorporated into the respective TOIM 316A, 316B, 316C or other modules on the respective workstation 310A, 310B, 310C. Each EIM 318A, 318B, 318C allows a respective trader to send information to the execution venue 110 and view and respond to information received from the execution venue 110. Typically, the received information includes information about orders (through the indications module 216 of FIG. 2) and orders (through the negotiation module 218 of FIG. 2) that the execution venue 110 receives from other traders. Each trader uses a respective EIM 318A, 318B, 318C to enter into and transact negotiations to buy and/or sell securities through the execution venue 110.

The network 314 connects the workstations 310A, 310B, 310C to the OMS 312, the OMS Database 114, an OMS Integration Module 320 (discussed in more detail below) and to external networks such as a network in communication with the execution venue 110. The network 314 can utilize any networking technology that supports bi-directional transfer of data among the various elements mentioned above. In one example, the network 314 is a private local area network (LAN) installed at a financial institution and interfacing with one or more external gateways. In another example, the network may be wireless, connect devices over a wide area, and/or at least partially carry data over a public network (such as the Internet). Other network components, such as a firewall, may also be present. Those of ordinary skill in the art will recognize that many different types of networks can perform the functionality described herein.

The OMS 312 may be comprised of one or more computer systems (e.g., one or more servers) for executing and maintaining an order management system. The OMS 312 receives instructions from the workstations 310A, 310B, 310C to create, modify, and/or delete orders and updates the OMS Database 114 accordingly. Software providing the functionality of the OMS 312 is well known in the art. Commercial OMS software packages are available from The MacGregor Group, Eze Castle Software, Advent Software, and Decalog, to name but a few. In addition, some trading institutions utilize custom OMS software.

According to one embodiment of the present invention, the trading system 112 may comprise a network, client software installed on a traders' and system administrator's computers and an integration adapter, which integrates, for example, the execution venue with a member's OMS.

In one example, each and every member has an OMS with which the execution venue can interface.

When a trader logs on to a workstation, the integration adapter may electronically transmit the orders to the execution venue from the member's OMS assigned to that trader. After the trader has logged on, the integration adapter may periodically query the member's OMS and update the execution venue with changes from the OMS.

Orders from a member's OMS may be transmitted to the execution venue as non-binding "indications of liquidity" (also referred to as "indications"). In one embodiment, indications of liquidity may be filtered or removed from the execution venue where the related OMS order has a limit instruction that is outside the market (if the OMS limit price for a buy order is below the best bid price in the applicable market, or the OMS limit price for a sell order is above the best ask price in the applicable market, then such order is considered "outside the market"). In any case, when a trader has an indication in the execution venue which has not been filtered or removed, the execution venue displays to the trader if there is at least one other trader with a matching indication on the opposite side. A matching indication (or "match") is one that is in the same security and instrument type and where both the trader and the contra are within each other's minimum tolerance quantities (see below). A match may appear to the trader as a ticker button in a specialized "liquidity ticker" that is displayed on the trader's desktop. Contra as used herein is defined as traders with matching indications on the opposite side. A trader may remove an indication from the execution venue, at which time the indication will not be displayed to contras. In one embodiment, when a trader removes an indication from the execution venue, the trader can set a price alert. The price alert notifies the trader that the price set for the indication is back in the market. The execution venue may determine matches based on security IDs provided by each member. In one example, the execution venue only matches a buy and sell indication for a security if they are of the same instrument type.

In one example, the members may trade U.S. equity securities and ADRs through the execution venue as well as foreign securities such as from the U.K., Austria, Belgium, Denmark, Finland, France, Germany, Italy, Norway, Sweden and Switzerland. Each instrument being traded may be given an instrument type which determines the country where any resulting execution will clear and settle. In another example (shown below in Table 1), there are thirteen instrument types that correspond to the following exchanges/markets where the security is listed and admitted for trading:

TABLE 1

| Instrument Type | Exchange/market where security is listed/admitted for trading | Settlement Currency | Settlement Country |
|---|---|---|---|
| ATE | Wiener Borse | Euros | Austria |
| BEE | Euronext | Euros | Belgium |
| CHE | Swiss Stock Exchange, Virt-x, Berne Stock Exchange | Swiss francs | Switzerland |
| DEE | Xetra, German regional exchanges | Euros | Germany |
| DKE | Copenhagen Stock Exchange | DKK | Denmark |
| FIE | Hex - Helsinki Stock Exchange | Euros | Finland |
| FRE | Paris Stock Exchange, Le Nouveau Marche | Euros | France |
| ITE | Borsa Italiana | Euros | Italy |
| NLE | AEX Stock Exchange | Euros | Netherlands |
| NOE | Oslo Bors | NOK | Norway |
| SEE | OMX Stockholm Stock Exchange | SEK | Sweden |
| UKE | London Stock Exchange | U.K. pence | U.K. |
| USE | NYSE, AMEX, NASDAQ | U.S. dollars | U.S. |

Each OMS may have an order and availability quantity that is specific to each member's OMS. In one embodiment, the order quantity is the quantity specified in the member's OMS for a particular OMS order and the available quantity is the quantity specified in the member's OMS for a particular OMS order, less the quantity previously executed or reserved for other trading venues, as specified in the member's OMS. The order quantity and available quantity are determined by the member's OMS (in one example, a trader cannot change these quantities in the execution venue except by changing the quantities in his OMS).

In one embodiment, a working quantity for each indication in the execution venue may default to the available quantity for that indication, but can be manually changed to less than (but not more than) the available quantity. The working quantity of this embodiment determines tolerances for matching and may be used as the maximum negotiation quantity during negotiations. In one example, a trader can change his working quantity for an indication at any time prior to a negotiation.

Minimum tolerance quantities (or "tolerances") can also be set for matching by reference to each trader's working quantity and tolerance percentage. Each member may establish a tolerance percentage at the member level (e.g., ranging from 0% to 25%). In one example, a trader can adjust this default tolerance percentage at the trader level and at the indication level.

A trader's minimum tolerance quantity for an indication would equal the trader's working quantity for the indication times the trader's tolerance percentage. The execution venue of this embodiment would then only display a match if, for the trader on each side, the contra's working quantity equals or exceeds the trader's minimum tolerance quantity.

For example, if a trader has defined a tolerance percentage of 20% and a working quantity of 100,000 shares for an indication, the trader will only see contras with 20,000 shares or more. Conversely, other traders with indications of less than 20,000 shares would not see the first trader's indication for 100,000 shares. This 20,000 share amount is known as the trader's minimum tolerance quantity for this indication. Conversely, if the second trader has an indication for 500,000 shares and a tolerance percentage of 25%, the two traders would not see each other's indications because the working quantity of the first trader (100,000 shares) is not within the 125,000-share minimum tolerance quantity (0.25*500,000) of the second trader.

In one embodiment, a trader can indicate that he is ready to receive negotiations by setting his indication "active". The indication that is made active is then known as an "active indication." An active indication is then displayed to all contras to see if the execution venue can generate a match. It should be noted that just because an indication goes active, doesn't necessarily have to create a binding bid or offer. In one example, a trader can set all indications as active by default.

It should be understood that the traders may interact with any of a number of different interfaces that provide the functionality described herein, such as Graphical User Interfaces (GUI) viewed on a personal computer of a respective trading system. When the execution venue notifies a trader of one or more active contras for a security, the trader can start a negotiation for that security by selecting a contra, specifying a price and negotiation quantity, and submitting a bid or offer ("sending an invitation"). In this embodiment, when a trader sends an invitation in response to an active indication, he is making a firm bid or offer. The trader can also set a negotiation quantity which is the quantity set by a trader when he makes a bid, offer, counter-bid or counter-offer or agreed to by a trader when he accepts a bid, offer, counter-bid or counter-offer. A trader's negotiation quantity would generally default to his working quantity at the start of a negotiation, but the trader can modify his negotiation quantity before submitting a bid, offer, counter-bid, or counter-offer.

The negotiations may be anonymous one-to-one negotiations through which traders submit bids and offers to each other. The first bid or offer in a negotiation is submitted when one trader opens the negotiation room and sends an invitation. Subsequent bids and offers may be submitted as counter-bids or counter-offers in the negotiation. In one example, a trader or a group of traders may only enter into a negotiation with respect to a specific indication with one contra at a time. Prices specified in bids and offers of this example are limit prices. Bids and offers in negotiations of this example are firm orders. Prior to starting a negotiation, submitting a bid or offer, or taking any other action in a negotiation, a trader may need to verify that the price and quantity and other information relating to that action accurately reflect the trader's and the member's intended action. In particular, the trader should confirm that the bid or offer price is within any limit price set by the member and within any price and quantity limits set in the member's OMS. When one trader starts a negotiation and makes a bid or offer, the contra may agree to open the negotiation or reject the invitation. After opening the negotiation, the contra may do any of the following: accept the bid or offer, submit a counter-bid or counter-offer, allow the bid or offer to expire by not responding within the configured time period (e.g., 30 seconds), request additional time or end the negotiation. Traders may also send messages to each other during a negotiation via a chat feature though a communication program as is well known in the art. Additionally, after a trader submits a bid or offer, he may have the option to cancel that bid or offer by either clicking "cancel", to cancel the bid or offer; or clicking "end", to terminate the negotiation. If a trader cancels a bid or offer, he is allowed, in this example, to resubmit another bid or offer.

A trader may also submit a counter-bid or counter-offer by specifying a negotiation quantity and price. If a trader submits a counter-bid or counter-offer, the trader receiving the counter-bid or counter-offer has the same options as when opening a negotiation as discussed above. A trader can also terminate a negotiating by for example clicking "end" on his interface. In the event that a trader's submitted bid or offer is not accepted by a contra within the established time period (e.g., 30 seconds), the submitted bid or offer will, in this example, expire. Either trader can submit a bid or offer in a negotiation after one of the traders has failed to respond to a bid or offer within the pre-determined time limit. After a time expiration, if the two traders submit a bid and offer, respectively, at the same price and within each other's tolerances, and prior to either trader receiving the other trader's bid or offer, predetermined rules will govern which bid or offer is treated as an accept. In one embodiment the execution venue may require the trader to confirm an order if the order is significantly away from the market. The execution venue can also establish a minimum tolerance quantity during negotiation.

In this embodiment, a trader specifies a negotiation quantity each time he submits a bid or offer. If the negotiation quantity submitted by a trader is below the contra's minimum tolerance quantity, the contra will be notified that the bid or offer is below his tolerance. The contra then has the same options as he would have in response to any other bid or offer. The execution venue establishes a trader's minimum tolerance quantity during a negotiation by multiplying the trader's working quantity and tolerance percentage. For example, if a trader has a working quantity of 100,000 shares and a tolerance percentage of 20%, his tolerance for the negotiation is 20,000 shares. In one embodiment, a trader can change his working quantity for an indication prior to a negotiation.

If a trader submits a bid during a negotiation that is higher than the contra's offer, or submits an offer during a negotiation that is lower than the contra's bid, the execution venue will treat this bid or offer as a counter-bid or counter-offer. A trader can, for example, accept a contra's bid or offer by clicking accept, or submitting the same price as the price of the contra's bid or offer (as long as the trader's negotiation quantity is within the contra's tolerance).

In one embodiment, the execution venue determines the effectiveness of an acceptance, cancellation, or end request based upon which event is first received by the back-end software of the execution venue and recorded in the database. Accordingly, a cancellation or end request is effective over an acceptance if the back-end software of the execution venue receives and records in the database the cancellation or end request prior to the receipt and recording of the acceptance; conversely, an acceptance is effective over a cancellation or end request if the back-end software of the execution venue receives and records in the database the acceptance prior to the receipt and recording of the cancellation or end request. An effective acceptance received and recorded as set forth above constitutes an executed trade in the execution venue. In this embodiment, all bids, offers, withdrawals and modifications of bids or offers, counter-bids and counter-offers, requests for additional time, grants of requests for additional time, and rejections and acceptances of bids or offers are deemed effective when they are received and recorded by the back-end software of the execution venue, and are not effective until such time. In this embodiment, an acceptance is effective in accordance with the preceding, and a trade is executed for the lesser of the two parties' negotiation quantities. The execution venue may confirm the trade by sending a message to the trader when the trader submits a bid, offer or other instruction during the negotiation process.

Additionally, after a trade is executed, the participants can continue to negotiate and execute trades with respect to the same security as long as they each have a remaining working quantity, even if one trader's remaining quantity is below the contra's minimum tolerance quantity. In a continuing negotiation, either party can submit a bid or offer and the negotiation quantity for each trader defaults to the lesser of the trader's negotiation quantity at the time of execution and the trader's current working quantity. In a continuing negotiation, if the two traders submit a bid and offer, respectively, at the same price and within each other's tolerances, and prior to either trader receiving the other trader's bid or offer, the second bid or offer received by the back-end software of the execution venue will be treated as an accept.

As discussed above, various embodiments of the present invention facilitate the negotiated trading of securities between traders associated with members authorized to use the execution venue.

Other embodiments of the present invention (such as discussed in detail below) facilitate: (a) the non-negotiated trading of securities between traders associated with members authorized to use the execution venue (via "auto-orders"); and (b) the non-negotiated trading of securities between: (i) traders associated with members authorized to use the execution venue; and (ii) one or more streaming liquidity providers (via "streaming orders").

In one embodiment, a trader can create an auto-order from an indication by setting all or a portion of the indication to auto-execute. A trader can set an indication to auto-execute whether or not the trader has a matching contra indication within the execution venue. To set an auto-order, the trader specifies a limit price (referred to as a "price constraint") and quantity. In one example, an auto-order may only execute against another auto-order, or against a streaming order from a streaming liquidity provider (described in more detail below). It should be noted that an auto-order executes at the mid-point, but execution only occurs if the execution price is within the price constraints of the auto-order and the contra's auto-order or streaming order (in one example, in determining the mid-point, the best bid and best ask may be determined by reference to a market data feed provided by a market data provider). The quantity of any execution is the lesser of the quantity of the auto-order and the quantity of the opposite-side auto-order or streaming order (e.g., rounded down to the highest round lot). In this embodiment, a trader can request cancellation (or edit) of an auto-order. Cancellation (or edit) is effective upon receipt and processing by the back-end software of the execution venue except to the extent the back-end software of the execution venue has previously processed an execution. In one example, the auto-orders can also be set up to only be day orders and automatically cancelled at the close of trading of the regular session of the applicable market (e.g., 4 pm for US markets).

In another embodiment, there is a list of streaming liquidity providers who are not able to view any indications, nor are they able to participate manually in any negotiations. The streaming liquidity providers of this embodiment only have the ability to transmit streaming orders to the execution venue. To effectuate this, the execution venue provides to the back-end software of each of the streaming liquidity providers a real-time data feed that notifies the back-end software of each of the streaming liquidity providers of orders in the execution venue. This data feed may include, for example, a ticker symbol, side (buy or sell) and size (subject to masking at certain quantity levels) with respect to each order notification message sent from the execution venue to each streaming liquidity provider (discussed in more detail below). Streaming liquidity providers automatically incorporate the order notifications from the order notification messages into their non-displayed internal routing montages and route orders in response thereto to the execution venue. For each streaming order, the streaming liquidity provider may specify, for example, the security, side (buy or sell) and quantity. Streaming liquidity providers also can specify the customer's limit price (referred to as a "price constraint"). If no limit price is specified (i.e., a market order), the execution venue imputes the following price constraint: current best bid (in the case of a streaming sell order) and current best ask (in the case of a streaming buy order). A streaming order also executes at the mid-point, but execution only occurs if the execution price is within the price constraints of the streaming order and the contra's auto-order. In this example, the quantity of each execution is the lesser of the quantity of the streaming order and the quantity of the opposite-side member auto-order (but rounded down to the highest round lot). In the case of a conflict where the execution venue receives two (or more) same-side orders in the same security available for execution, and the execution venue then receives a contra-order, the execution venue will, in one example, execute the two (or more) same-side orders equally.

In this embodiment, an execution or cancellation of an auto-order or streaming order is deemed effective when it is received, processed and recorded by the back-end software of the execution venue. The effectiveness therefore of an execution or cancellation depends upon which event is first received, processed and recorded by the back-end software of the execution venue.

In one embodiment, streaming liquidity gives members (and their associated traders) the ability to interact with additional liquidity from external sources such as for example (but not limited to) retail and institutional brokers, provided the broker maintains an internal non-displayed montage and routes orders to one or more execution venues based on the bid and ask data in the montage.

In one embodiment, streaming liquidity providers send the liquidity to the execution venue in the form of marketable, immediate or cancel (IOC) orders. Marketable means that orders can be executed by the execution venue because they are at or better than the current mid-point. IOC means that an order takes a single pass through the execution venue and either immediately executes or leaves the execution venue. As such, streaming orders sent by streaming liquidity providers in this example do not reside on the execution venue's order book.

As mentioned above, streaming liquidity providers may determine which orders to send to the execution venue by receiving notification messages in a data feed from the execution venue. The data feed may inform the streaming liquidity providers of the aggregate buying or selling interest for a given symbol (meaning the unfilled quantities of all potential orders that are currently executable for a symbol/side are grouped together). In one example, a streaming liquidity provider can request to receive this data feed by symbol, exchange, or for all symbols.

Based on a streaming liquidity provider's agreement with the execution venue (e.g., an agreement with an entity that operates the execution venue), the execution venue may transmit data indicating whether or not the execution venue has executable orders available for a symbol and side. In one example, in order to protect the anonymity of the members, the quantity of the execution venue's representation for buying or selling a given symbol may not exceed 10,000 shares.

The execution venue may inform traders when indications in the execution venue appear to be well suited for execution against streaming liquidity. Indications that are well suited for execution against streaming liquidity are considered "opportunities". An opportunity can exist for a matched indication, an outside indication, or an active/passive indication that currently does not have a contra.

In one example, in order to determine if an indication is an opportunity, the execution venue may consider: 1) the amount of volume (e.g., 10-day historical contra volume), on average, that streaming liquidity providers have sent to the execution venue for the security (hereinafter referred to as "liquidity provider volume"), 2) the size of the indication's working quantity relative to the market's average daily volume (e.g., weighted average, straight line average) for the security (hereinafter referred to as indication as a % of average daily volume), 3) liquidity provider volume relative to the overall market's average daily volume for the security, and/or 4) whether some portion of the indication has already executed in the execution venue.

For example, three situations where an opportunity would be presented are: (i) the indication's working quantity is a large percentage of average daily volume and the execution venue has historical data indicative of a fair amount of liquidity provider volume; (ii) the indication's working quantity is of a decent size (not trivial) and there is enough liquidity provider volume to fill it; or (iii) the trader has already traded the name in the execution venue and there is a meaningful amount of liquidity provider volume.

Traders may create one or more auto-orders. In one example, only one auto-order at a time may exist for an indication. An auto-order may contain a side and symbol, which are derived from the indication, as well as a quantity and a price constraint. The quantity may be any portion of an indication's current working quantity and may be a round lot. Auto-orders execute at the mid-point subject to (up to for a buy, down to for a sell) the price constraint that has been set by the trader. An indication does not have to be identified as an opportunity for a trader to create an auto-order.

In this embodiment, the traders have the ability to edit, pause, resume, or cancel an auto-order. The price and/or quantity of an auto-order order may be edited. A paused auto-order is unavailable for execution while paused (however, the indication can still execute through negotiation). To continue executing a paused auto-order, a trader can simply resume the auto-order. Editing a paused auto-order also causes the paused auto-order to resume. A trader may cancel an auto-order at any time prior to the auto-order having been fully executed. Unlike indications, auto-orders are available for immediate execution. They are firm orders; therefore, when an auto-order is created or changed, the execution venue immediately affects a placement for the auto-order in the trader's OMS.

Auto-orders of this embodiment automatically execute at the current mid-point. Auto-orders can execute against liquidity sent from streaming liquidity providers in the form of streaming orders and against other trader auto-orders created by other traders associated with members.

In order for an auto-order to be eligible to execute the security must be "open" (meaning it is not paused, canceled, or already fully executed) and the auto-order's price constraint must be met by the current mid-point. If an auto-order's price constraint is not met by the current mid-point the trader is informed through the GUI.

When multiple streaming orders for the same side/security are eligible to execute at the same time, the execution venue may equally distribute available contra liquidity. If the execution venue only executes a trade in round lots, and when equal distribution among multiple traders results in odd lot executions, the execution venue may randomly distribute the extra 100 shares to a trader, but may remember to which trader the extra shares were allocated and may attempt to equalize with subsequent flow that cannot be evenly divided.

When an auto-order exists on an indication, the indication still matches with available contras on its entire working quantity, including the unfilled quantity for the auto-order. Any quantity that has already been executed for the auto-order is no longer available for matching.

A trader can initiate a negotiation for an indication that has an open auto-order. However, in one example, an auto-order cannot be open for execution at the same time that an indication is being negotiated. When a trader enters into a negotiation for an indication with an open auto-order, the execution venue may automatically pause the auto-order. Resuming the auto-order during negotiation may end the negotiation. When a negotiation ends, if there is remaining quantity on the indication the trader may be prompted to resume his auto-order.

In another embodiment, traders may be notified of potential availability of liquidity as follows. For example, if a trader has an indication or order in the execution venue, the execution venue may display "coverage data" to the trader applicable to that indication or order. In one example, "coverage data" may mean the average (e.g., weighted average, straight line average) daily number of shares that the execution venue and the venues to which the execution venue transmits order notification messages had matching contra orders over a specified number of days (for example, the preceding five days), as a percentage of the trader's indication or order size. Coverage data may also take into account contra-orders in the execution venue and at other venues to which the order notification messages are transmitted; for purposes of calculating the daily average for a particular indication or order, contra-orders within the execution venue and contra-orders within all of the venues to which the execution venue transmits order notifications may be aggregated. This provides the trader with an estimate of potential liquidity based on historical liquidity at venues to which order notification messages are sent.

Figure 4:
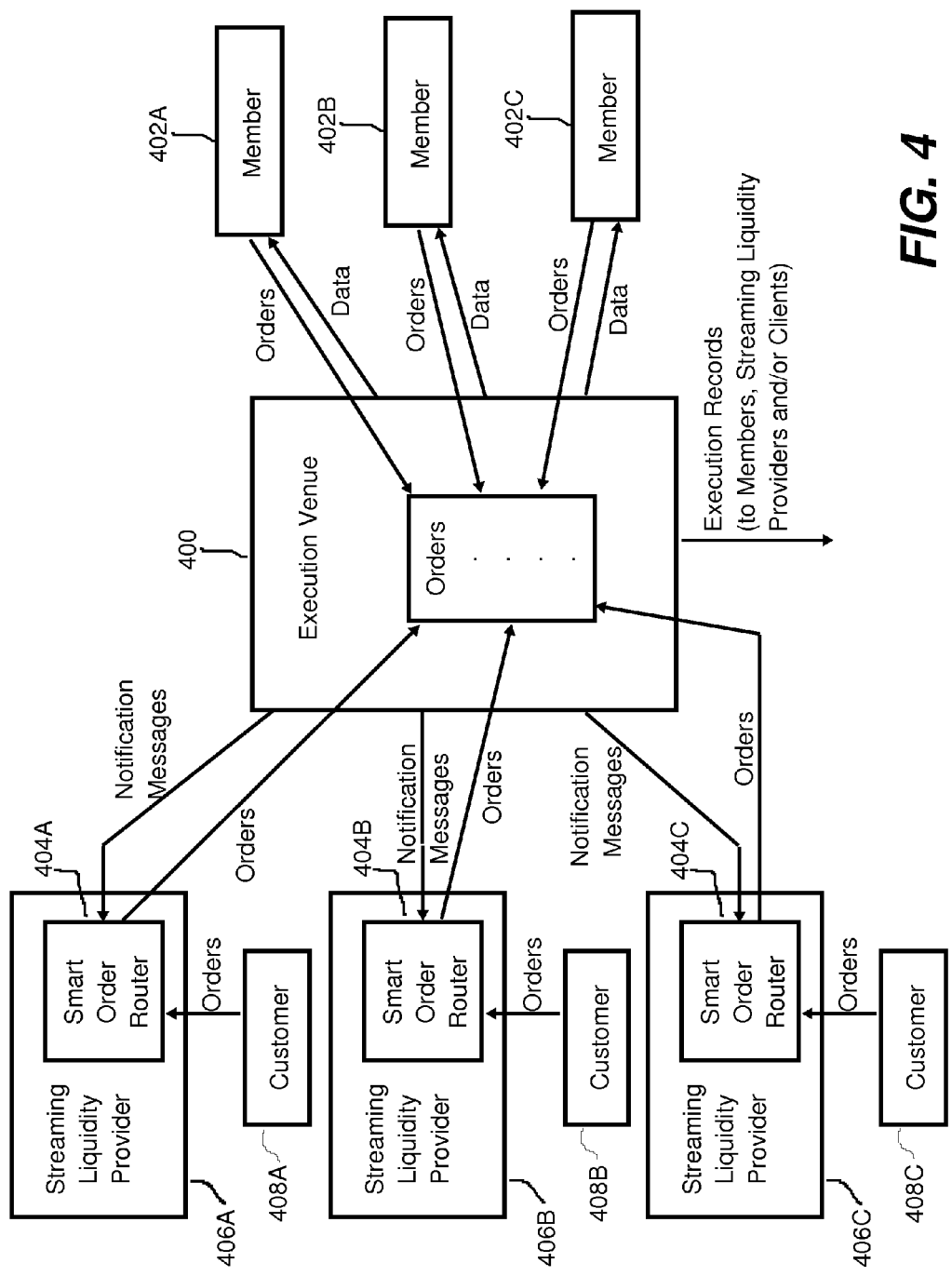
FIG. 4 shows a block diagram illustrating an execution venue according to another embodiment of the present invention.

Reference is now made to FIG. 4. This FIG. 4 shows an embodiment of the present invention that relates to a computer implemented execution venue that sends a notification message of the existence of a non-displayed priced order to each of a plurality of smart order routers such that one or more of the smart order routers can each send at least one order to the execution venue to execute at such venue against the non-displayed priced order.

More particularly, it is seen in this FIG. 4 that execution venue 400 is in communication with each of members 402A, 402B, 402C (the communication may be carried out in a manner similar to that of FIGS. 1-3, wherein each member 402A, 402B, 402C has associated therewith a respective trading system of the type of FIGS. 1 and 3 and wherein execution venue 400 is of the type of FIGS. 1 and 2).

Further, execution venue 400 is in communication with smart order routers 404A, 404B, 404C of each of streaming liquidity providers 406A, 406B, 406C (the communication may be carried out, for example, electronically, using any mechanism similar to that described above with reference to the communication between execution venue 110 and trading systems 112A, 112B, 112C). As seen, each streaming liquidity provider 406A, 406B, 406C interacts with execution venue 400 via each respective smart order router 404A, 404B, 404C such that no individual trading for one of the streaming liquidity providers 406A, 406B, 406C can view any indications or orders at execution venue 400.

Further still, customer 408A is in communication with streaming liquidity provider 406A, customer 408B is in communication with streaming liquidity provider 406B and customer 408C is in communication with streaming liquidity provider 406C (in one example, the communication may be carried out directly with a respective smart order router electronically, using any mechanism similar to that described above with reference to the communication between execution venue 110 and trading systems 112A, 112B, 112C; in another example, the communication may be carried out manually, such as by email or telephone call to a broker).

Of note, while this FIG. 4 depicts three members, any desired number of members may, of course, communicate with execution venue 400. Similarly, while this FIG. 4 depicts three streaming liquidity providers, any desired number of streaming liquidity providers may, of course, communicate with execution venue 400. Likewise, while this FIG. 4 depicts three customers, any desired number of customers may, of course, communicate with each of the streaming liquidity providers.

Still referring to FIG. 4, it is seen that orders from members 402A, 402B, 402C are placed on execution venue 400. Further, orders from customers 408A, 408B, 408C are placed on smart order routers 404A, 404B, 404C of each streaming liquidity provider 406A, 406B, 406C (which may be, for example, a broker). Based on at least one order in execution venue 400, execution venue 400 sends a notification message of the existence of a non-displayed priced order to each of the smart order routers 404A, 404B, 404C (notification messages of this embodiment are not visible to the streaming liquidity providers 406A, 406B, 406C nor to the customers 408A, 408B, 408C).

In response to the notification message, and based on orders received from customers, one or more of the smart order routers 404A, 404B, 404C sends back at least one order to the execution venue 400 to execute at the execution venue 400 against the non-displayed priced order (data recording the execution may be sent by the execution venue to the member involved with the execution and the steaming liquidity provider involved with the execution (the streaming liquidity provider may notify its customer as desired regarding the execution)).

Of note, the notification message (or information related thereto) may be placed at the top of the book of each of the smart order routers 404A, 404B, 404C due to the non-displayed order associated with the notification message being a priced order.

Of further note, any of customers 408A, 408B, 408C and/or any of streaming liquidity providers 406A, 406B, 406C may determine which order routing algorithm of a respective one of smart order routers 404A, 404B, 404C is used.

Of further note, any of smart order routers 404A, 404B, 404C may have an order routing algorithm including instructions to route to execution venue 400 based at least in part upon execution venue 400 showing the mid-point (since execution venue 400 shows the mid-point, execution venue 400 can be the first (or one or the first) execution venues in the order routing table of the order routing algorithm).

Of further note, each of the execution venue and the streaming liquidity providers may utilize a FIX (Financial Information Exchange) engine for communicating in the FIX protocol.

The following Tables 2-5 depict examples of data that may be stored and/or communicated before, during and after a trade execution carried out using the mechanism of FIG. 4:

TABLE 2

Auto-order recorded in the database table of execution venue

MEMBERORDERID=7460
LNPLACEMENTID=684609
PLACEMENTSEQUENCE=1
MEMBERID=ABC
LNSYMBOL=SCSS
SIDE=BY
SHORTSELLFLAG=0

TABLE 2-continued

Auto-order recorded in the database table of execution venue

MOTARGETQUANTITY=50000
MOFILLSQUANTITY=0
MOLEAVESQUANTITY=50000
MOLIMITPRICE=21.9
CREATIONTIME=9/14/2006 9:41:17 AM
ENDTIME=NULL
CANCELREASON=NULL
MOOWNER=John Smith
ENHANCEDMOSTATUS=OPEN
MOSTATUSREASON=NULL
MOINTHEMARKET=0
BID=21.77
ASK=21.83
MID=21.80
LAST=21.84
REPORTABLETARGETQUANTITY=50000
REPORTABLELIMITPRICE=21.9
REQUESTEDMOTARGETQUANTITY=50000
REQUESTEDMOLIMITPRICE=21.9
REQUESTINGTRADER=John Smith
AVGPRICE=0
FSMSTATE=open
LASTSTREAMERREQUESTID=1
SEQUENCE=156896
TOTALPRICEQUANTITY=0
CREATIONTIMESTAMP=9/14/2006 9:41:17 AM

TABLE 3

Notification message to smart order routers
from execution venue (FIX message)

8=FIX.4.0|9=0103|35=S|34=12239|49=LQNTQ|56=
ABCD|52=20060914-13:41:17|55=SCSS|117=
357807|131=4954|132=0|133=0|134=50000|10=239|

Description of select tags:
35 - MsgType (S = Quote);
55 - Symbol (SCSS);
134 - Bid Size (50,000)

TABLE 4

Smart order router order back to
execution venue (FIX message)

8=FIX.4.0|9=135|35=D|34=190|49=ABCD|50=
ABCD|52=20060914-13:46:21|56=LQNT|57=
T1|11=PA001|21=1|38=11000|40=2|44=
21.50000000|47=A|54=2|55=SCSS|59=
3|114=N|10=175|

Description of select tags:
35 - MsgType (D = Order - Single);
38 - OrderQty (11,000);
40 - OrdType (2 = Limit);
44 - Price (21.5);
54 - Side (2 = Sell);
55 - Symbol (SCSS)

TABLE 5

Execution recorded in database table of execution venue

MOEXECUTIONID=797637
EXECUTIONPAIRID=142038
CROSSINGID=797636
LNPLACEMENTID=684609
MEMBERORDERID=7460
MEMBERID=ABC
QUANTITY=11000
PRICE=21.52
TRADEDATETIME=9/14/2006 9:46:21 AM

TABLE 5-continued

Execution recorded in database table of execution venue

SETTLEMENTDATE=9/19/2006
COMMISSIONTYPE=1
COMMISSIONRATE=0.02
COMMISSIONAMOUNT=220

Finally, the present invention may, of course, be implemented using any appropriate computer hardware and/or computer software. In this regard, those of ordinary skill in the art are well versed in the type of computer hardware that may be used (e.g., mainframe(s), mini-computer(s), server(s), personal computer(s), mobile computing devices (e.g., telephones, PDA's) one or more networks (e.g., an intranet and/or the Internet)), the type of computer programming techniques that may be used (e.g., object oriented programming), and the type of computer programming languages that may be used (e.g., C++, Basic). The aforementioned examples are, of course, illustrative and not restrictive.

While a number of embodiments of the present invention have been described, it is understood that these embodiments are illustrative only, and not restrictive, and that many modifications may become apparent to those of ordinary skill in the art. For example, certain methods may be "computer implemented". In this regard, it is noted that while such methods can be implemented using a computer, the methods do not necessarily have to be implemented using a computer. Also, to the extent that such methods are implemented using a computer, not every step must necessarily be implemented using a computer. Further, while certain mechanisms for creating a non-displayed order at an execution venue prior to the transmission of a notification message have been described (e.g., auto-orders), other systems and methods for creating a non-displayed order at an execution venue prior to the transmission of a notification message may, of course, be utilized. Further still, the present invention may be utilized in connection with any desired number of streaming liquidity providers, and there does not necessarily need to be a one-to-one correspondence between streaming liquidity providers and smart order routers (e.g., one streaming liquidity provider may utilize a plurality of smart order routers or one smart order router may be shared by a plurality of streaming liquidity providers). In one example, there are at least five smart order routers that receive notification messages. In another example, there are at least ten smart order routers that receive notification messages. In another example, there are more than twenty smart order routers that receive notification messages. Further still, the dissemination of the notification messages to the smart order routers may be carried out simultaneously (or essentially simultaneously) or may be carried out serially. Further still, the existence of one or more notification messages relating to a given non-displayed priced order may be known by each of the smart order routers concurrently. Further still, any steps described herein may be carried out in any desired order (and any steps may be added and/or deleted).

What is claimed is:

1. A computer implemented trade execution method comprising:
obtaining, by a computer, from a plurality of order management systems, records of open orders to trade securities that meet at least one pre-determined filtering condition;
determining, by the computer, from the records of open orders, based, at least in part, on a historical trading data of an execution venue, at least one open order that can be at least partially executed at the execution venue thereby resulting in at least one opportunity;
providing, to at least one trader, the at least one opportunity;
receiving, by the computer, from at least one trader, at least one non-displayed priced order, wherein the non-displayed priced order is based, at least in part, on the at least one opportunity;
sending, by the computer, to each of a plurality of smart order routers, a real-time notification message that notifies each smart order router about the presence of the at least one non-displayed priced order at the execution venue;
updating, by the computer, in real-time, the notification message sent to each of the plurality of smart order routers to reflect any edit, cancel or pause of the at least one non-displayed priced order;
receiving, by the computer, at least one order sent from at least one of the smart order routers to at least partially execute against the at least one non-displayed priced order; and
executing, by the computer, at least one order received from the at least one of the smart order routers against the at least one non-displayed priced order.

2. The method of claim 1, wherein the notification message sent to and received at each of the smart order routers is the same notification message sent to and received at the other smart order routers.

3. The method of claim 1, wherein the notification message sent to and received at one of the plurality of smart order routers is distinct from the notification message sent to and received at another one of the plurality of smart order routers.

4. The method of claim 1, wherein the at least one non-displayed priced order is executed in its entirety against a single order from a single one of the smart order routers.

5. The method of claim 1, wherein the at least one non-displayed priced order is executed in part against one order from a single one of the smart order routers and is executed in part against another order from the same single one of the smart order routers.

6. The method of claim 5, wherein the at least one non-displayed priced order is executed in its entirety by being executed in part against one order from a single one of the smart order routers and by being executed in part against another order from the same single one of the smart order routers.

7. The method of claim 1, wherein the at least one non-displayed priced order is executed in part against one order from one of the smart order routers and is executed in part against another order from another one of the smart order routers.

8. The method of claim 7, wherein the at least one non-displayed priced order is executed in its entirety by being executed in part against one order from one of the smart order routers and by being executed in part against another order from another one of the smart order routers.

9. The method of claim 1, wherein the steps are carried out in the order recited.

10. A trade execution system, comprising:
at least one computer of an execution venue, wherein the at least one computer is programmed to:
obtain, from a plurality of order management systems, records of open orders to trade securities that meet at least one pre-determined filtering condition;
determine, from the records of open orders, based, at least in part, on a historical trading data of the execution venue, at least one open order that can be at least partially executed at the execution venue thereby resulting in at least one opportunity;

provide, to at least one trader, the at least one opportunity;

receive, from at least one trader, at least one non-displayed priced order, wherein the non-displayed priced order is based, at least in part, on the at least one opportunity;

send, to each of a plurality of smart order routers, a real-time notification message that notifies each smart order router about the presence of the at least one non-displayed priced order at the execution venue;

update, in real-time, the notification message sent to each of the plurality of smart order routers to reflect any edit, cancel or pause of the at least one non-displayed priced order;

receive at least one order sent from at least one of the smart order routers to at least partially execute against the at least one non-displayed priced order; and execute the at least one order received from the at least one of the smart order routers against the at least one non-displayed priced order.

11. The system of claim 10, wherein the notification message sent to and received at each of the smart order routers is the same notification message sent to and received at the other smart order routers.

12. The system of claim 10, wherein the notification message sent to and received at one of the plurality of smart order routers is distinct from the notification message sent to and received at another one of the plurality of smart order routers.

13. The system of claim 10, wherein the at least one non-displayed priced order is executed in its entirety against a single order from a single one of the smart order routers.

14. The system of claim 10, wherein the at least one non-displayed priced order is executed in part against one order from a single one of the smart order routers and is executed in part against another order from the same single one of the smart order routers.

15. The system of claim 14, wherein the at least one non-displayed priced order is executed in its entirety by being executed in part against one order from a single one of the smart order routers and by being executed in part against another order from the same single one of the smart order routers.

16. The system of claim 10, wherein the at least one non-displayed priced order is executed in part against one order from one of the smart order routers and is executed in part against another order from another one of the smart order routers.

17. The system of claim 16, wherein the at least one non-displayed priced order is executed in its entirety by being executed in part against one order from one of the smart order routers and by being executed in part against another order from another one of the smart order routers.

18. A non-transitory computer-readable medium comprising computer program code adapted to perform, when said program is run on a computer, the steps comprising:

obtaining, from a plurality of order management systems, records of open orders to trade securities that meet at least one pre-determined filtering condition;

determining, from the records of open orders, based, at least in part, on historical trading data of an execution venue, at least one open order that can be at least partially executed at the execution venue thereby resulting at least one opportunity;

providing, to at least one trader, the at least one opportunity;

receiving, from at least one trader, at least one non-displayed priced order, wherein the non-displayed priced order is based, at least in part, on the at least one opportunity;

sending, to each of a plurality of smart order routers, a real-time notification message, wherein the notification message notifies each of the smart order routers about the presence of the at least one non-displayed priced order at the execution venue;

updating, in real-time, the notification message sent to each of the plurality of smart order routers to reflect any edit, cancel or pause of the at least one non-displayed priced order;

receiving at least one order sent from at least one of the smart order routers to at least partially execute against the at least one non-displayed priced order; and executing at least one order received from the at least one of the smart order routers against the at least one non-displayed priced order.

19. The method of claim 1, wherein the at least one non-displayed priced order relates to a stock.

20. The system of claim 10, wherein the at least one non-displayed priced order relates to a stock.

21. The computer program of claim 18, wherein the at least one non-displayed priced order relates to a stock.

22. The method of claim 1, wherein the at least one non-displayed priced order is a non-displayed mid-peg order.

23. The system of claim 10, wherein the at least one non-displayed priced order is a non-displayed mid-peg order.

24. The computer program of claim 18, wherein the at least one non-displayed priced order is a non-displayed mid-peg order.

25. The method of claim 1, wherein the historical trading data of the execution venue comprises at least one from the group of:
   a) liquidity provider volume;
   b) a percent of average daily volume;
   c) a liquidity provider volume relative to an overall market's average daily volume for a stock; and
   d) the at least one trader's at least one previously executed priced order for the stock.

26. The trade execution system of claim 10, wherein the historical trading data of the execution venue comprises at least one from the group of:
   a) liquidity provider volume;
   b) a percent of average daily volume;
   c) a liquidity provider volume relative to an overall market's average daily volume for a stock; and
   d) the at least one trader's at least one previously executed priced order for the stock.

27. The computer-readable medium of claim 18, wherein the historical trading data of the execution venue comprises at least one from the group of:
   a) liquidity provider volume;
   b) a percent of average daily volume;
   c) a liquidity provider volume relative to an overall market's average daily volume for a stock; and
   d) the at least one trader's at least one previously executed priced order for the stock.

* * * * *